United States Patent
Okubo et al.

(10) Patent No.: US 8,954,085 B2
(45) Date of Patent: Feb. 10, 2015

(54) BASE STATION AND METHOD IN MOBILE COMMUNICATION SYSTEM

(75) Inventors: Naoto Okubo, Tokyo (JP); Yoshiaki Ofuji, Tokyo (JP); Hiroyuki Ishii, Tokyo (JP); Anil Umesh, Tokyo (JP); Kohei Kiyoshima, Tokyo (JP); Tadashi Uchiyama, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 312 days.

(21) Appl. No.: 13/640,747

(22) PCT Filed: Apr. 7, 2011

(86) PCT No.: PCT/JP2011/058801
§ 371 (c)(1),
(2), (4) Date: Nov. 15, 2012

(87) PCT Pub. No.: WO2011/129260
PCT Pub. Date: Oct. 20, 2011

(65) Prior Publication Data
US 2013/0059595 A1 Mar. 7, 2013

(30) Foreign Application Priority Data
Apr. 15, 2010 (JP) ................. 2010-094306

(51) Int. Cl.
*H04W 72/00* (2009.01)
*H04W 72/12* (2009.01)
(52) U.S. Cl.
CPC ...... *H04W 72/1242* (2013.01); *H04W 72/1231* (2013.01)
USPC ........ 455/452.1; 455/405; 455/450; 455/451; 455/452.2

(58) Field of Classification Search
CPC ............ H04W 72/04; H04W 72/0486; H04W 72/0493; H04W 72/10; H04W 72/12
USPC .............. 455/405, 406, 408, 450, 451, 452.1, 455/452.2, 453
See application file for complete search history.

(56) References Cited

U.S. PATENT DOCUMENTS

| 7,684,525 B2* | 3/2010 | Kokkonen ...................... 375/347 |
| 2004/0208183 A1* | 10/2004 | Balachandran et al. . 370/395.21 |
| 2004/0253940 A1* | 12/2004 | Andrews et al. .............. 455/405 |

FOREIGN PATENT DOCUMENTS

JP 2004-320775 A 11/2004

OTHER PUBLICATIONS

International Search Report w/translation issued in PCT/JP2011/058801 mailed May 10, 2011 (2 pages).
(Continued)

*Primary Examiner* — Olumide T Ajibade Akonai
*Assistant Examiner* — Edd Rianne Plata
(74) *Attorney, Agent, or Firm* — Osha Liang LLP

(57) ABSTRACT

A base station allocates a radio resource to a scheduling-target user based on a scheduling metric which is calculated for each of scheduling-target users and calculates the amount of available data for each user. When the radio resource is allocated to the scheduling-target user, the amount of data ($D_{assign}$) to be communicated using the allocated radio resource is subtracted from the amount of available data ($D_{available}$) for the user. The amount of available data ($D_{available}$) for each user within a cell is updated (min (($D_{available}+D_{ref}$), $D_{ref}$)) to be less than or equal to a reference data amount in each control period ($T_{AMBR}$). The scheduling-target user is selected based on the amount of available data for each user.

8 Claims, 4 Drawing Sheets

(56) References Cited

OTHER PUBLICATIONS

Written Opinion issued in PCT/JP2011/058801 mailed May 10, 2011 (3 pages).

3GPP TS 24.301 V8.4.0; "3rd Generation Partnership Project; Technical Specification Group Core Network and Terminals; Non-Access-Stratum (NAS) protocol for Evolved Packet System (EPS); Stage 3 (Release 8)"; Dec. 2009 (276 pages).

* cited by examiner

BASE STATION AND METHOD IN MOBILE COMMUNICATION SYSTEM

TECHNICAL FIELD

The present invention relates to a base station and a method in a mobile communication system.

BACKGROUND ART

Various standard specifications regarding mobile communication systems have been developed by 3GPP (The 3rd Generation Partnership Project). In a 3G (3rd generation) system or an LTE (Long Term Evolution) system, a maximum rate used for communications can be controlled for each user. For example, the maximum rate for a user is determined according to the type of user's subscription or a service condition and provided from a core network to a base station. This maximum rate is refereed to as an AMBR (Aggregate Maximum Bit Rate). The AMBR can be found in 3GPP, TS 24.301, V8.4.0 (2009-12).

DISCLOSURE OF INVENTION

Problem(s) to be Solved by the Invention

A base station which receives an AMBR has to control user's communications to be in accordance with the maximum rate. However, 3GPP, TS 24.301, V8.4.0 (2009-12) does not define how the base station implements the control of user's communications.

It is a general object of the present invention to enable a base station to control a rate actually used by a user equipment terminal to communicate according to a maximum rate for each user which is provided from a core network.

Means for Solving the Problem(s)

In one embodiment of the present invention, there is provided a base station in a mobile communication system, including:

a scheduling unit configured to allocate a radio resource to a scheduling-target user based on a scheduling metric which is calculated for each of scheduling-target users; and a data amount calculating unit configured to calculate the amount of available data for each user; wherein when the radio resource is allocated to the scheduling-target user, the data amount calculating unit subtracts the amount of data to be communicated using the allocated radio resource from the amount of available data for the scheduling-target user, the data amount calculating unit updates the amount of available data for each user within a cell to be less than or equal to a reference data amount in each control period including plural time intervals for allocating radio resources, and the scheduling unit selects the scheduling-target user based on the amount of available data for each user.

Advantageous Effect of the Invention

According to the present invention, a base station can control a rate actually used by a user equipment terminal to communicate according to a maximum rate for each user which is provided from a core network.

DETAILED DESCRIPTION OF THE PREFERRED EMBODIMENTS

Figure 1:
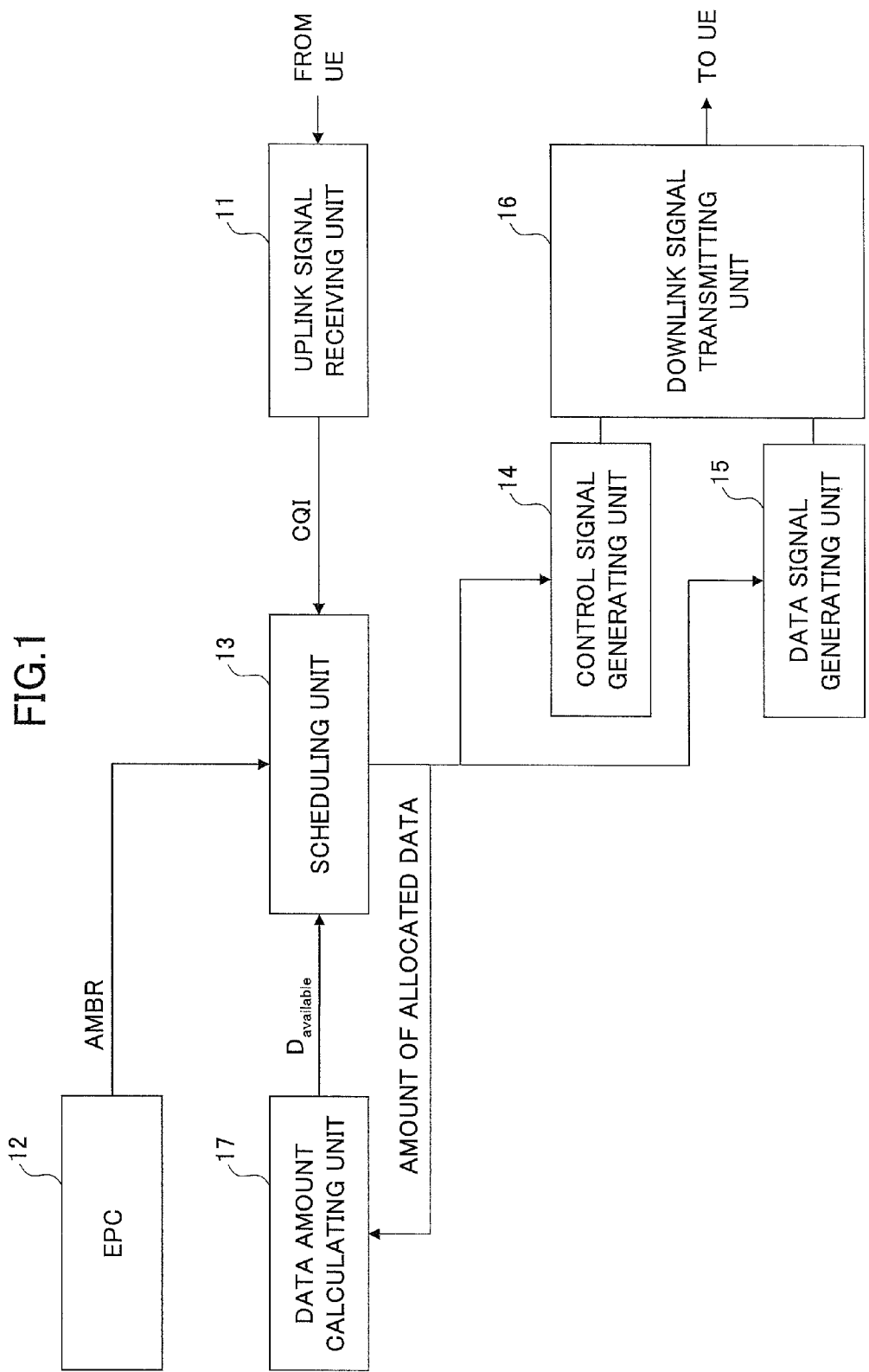
FIG. 1 shows a functional block diagram of a base station used in an embodiment of the present invention.

In the present invention, a control period $T_{AMBR}$ including plural time intervals (for example, sub-frames) for allocating radio resources is defined. A base station performs scheduling for a user in such a manner that the amount of data to be communicated by the user is limited to a constant value (reference data amount $D_{ref}$) or less within the whole of one or more control periods $T_{AMBR}$, as a general rule. The constant value $D_{ref}$ is derived from both a maximum rate (AMBR) provided for each user from a core network to the base station and the control period $T_{AMBR}$.

The base station calculates the amount of available data $D_{available}$, which can be used by a user to communicate, for each user. The amount of available data $D_{available}$ is updated in two scenarios. In a first scenario, the amount of available data $D_{available}$ is updated when a radio resource is allocated to a scheduling-target user (a user to be scheduled). In this scenario, the amount of data $D_{assign}$ to be communicated using the allocated radio resource is subtracted from the amount of available data $D_{available}$ for the user to which the radio resource is allocated.

$$D_{available} = D_{available} - D_{assign}$$

In a second scenario, the amount of available data $D_{available}$ is updated when the control period $T_{AMBR}$ is elapsed. When the control period $T_{AMBR}$ is elapsed, the amount of available data $D_{available}$ for each user within a cell is updated to be less than or equal to a reference data amount $D_{ref}$. When the amount of available data $D_{available}$ for a user is a positive value, the user is a scheduling-target user, and thus a radio resource can be allocated to the user according to a radio channel condition or the like. In this manner, in the present invention, the base station performs scheduling of radio resource allocation in such a manner that the amount of communication in each control period is limited to the constant value or less, as a general rule, thereby complying with the maximum rate (AMBR) provided from the core network.

According to this general rule, when the amount of available data $D_{available}$ for a user is not a positive value ($D_{available} \leq 0$), the user is not included in scheduling-target users. This is preferable from the viewpoint of simply complying with the maximum rate provided from the core network. However, it is preferable in certain circumstances that some types of information such as voice data, real-time data, or control information for handover not be prohibited from communications. For these types of information, it is preferable that the user be included in the scheduling-target users, even though the amount of available data $D_{available}$ for the user is not a positive value. As described above, when a radio resource is allocated to a user, the amount of data $D_{assign}$ to be communicated using the allocated radio resource is subtracted from the amount of available data $D_{available}$ for the user to which the radio resource is allocated ($D_{available} = D_{available} - D_{assign}$), and subsequently the amount of available data $D_{available}$ results in a negative value according to the amount of data used for communications. In a modified embodiment of the present invention, when a radio resource is allocated to a user for which the amount of available data $D_{available}$ is not a positive value, the user can only use the amount of data ($D_{available}+D_{ref}$) which is less than the reference data amount $D_{ref}$ in the next control period. For example, when the control period $T_{AMBR}$ is elapsed, the amount of available data $D_{available}$ for each user is updated to be the smaller of the reference data amount $D_{ref}$ or the amount of available data $D_{available}$ for each user plus the reference data amount $D_{ref}$.

$$D_{available}=\min((D_{available}+D_{ref}),D_{ref})$$

When user's communications exceed the amount of available data $D_{available}$ in a control period, the amount of available data in the next control period is updated to be a value less than the reference data amount $D_{ref}$ ($D_{available}$ $D_{ref}$). As a result, the amount of data communicated through the whole of the previous control period and the current control period is limited to a constant value or less. In addition, when $D_{available}$ is a positive value, the amount of data is limited to the reference data amount $D_{ref}$. Thus, it is possible to prevent $D_{ref}$ from being excessively large when the amount of data to be transmitted is small.

In the modified embodiment of the present invention, $D_{available}$ may be updated only if there are data to be transmitted for the user when the control period $T_{AMBR}$ is elapsed. In other words, if there are no data to be transmitted for the user, $D_{available}$ is not updated even though the control period $T_{AMBR}$ is elapsed. According to the modified embodiment, a data rate is appropriately limited when there are data actually to be transmitted for the user.

Embodiments of the present invention are described according to the following aspects.
1. Base station
2. Operational flow
3. Modified embodiment
4. Description of operations
[Embodiment 1]
<1. Base Station>

FIG. 1 shows functional components specifically associated with the present embodiment among various functional components in a base station. For convenience of explanation, it is assumed that the base station is a base station (eNB: evolved Node B) in an LTE mobile communication system. However, the present invention is not limited to the base station in the LTE mobile communication system, but any suitable base station for performing scheduling may be used. The base station is also referred to as an access point. In addition, while the present embodiment focuses on control in downlink, the present invention is not limited to control in downlink but may be also applied to scheduling in uplink.

FIG. 1 shows an uplink signal receiving unit 11, a core network (EPC: Evolved Packet Core) 12, a scheduling unit 13, a control signal generating unit 14, a data signal generating unit 15, a downlink signal transmitting unit 16, and a data amount calculating unit 17.

The uplink signal receiving unit 11 receives uplink signals transmitted from a user equipment terminal (UE: User Equipment) (not shown). For example, the uplink signals include a physical uplink shared channel (PUSCH) and a physical uplink control channel (PUSCH). For example, control information transmitted via the PUSCH or the PUCCH includes downlink quality information (CQI: Channel Quality Indicator) and acknowledgement information (ACK/NACK) of a physical downlink shared channel (PDSCH). Reference signals are transmitted together with the PUSCH or the PUCCH. The reference signals include sounding reference signals (SRSs) and demodulation reference signals (RSs).

The core network 12 represents a core network arranged in an upper layer of the base station. While the core network 12 is an evolved packet core network (EPC) in the shown example, the present invention is not limited to the EPC but any suitable core network or exchange may be used. The core network 12 performs processing regarding the core network in the mobile communication system, such as management of subscriber information, mobility management, control of originating calls or incoming calls, billing control, or QoS (quality of service) control, for example.

The scheduling unit 13 performs scheduling of radio resource allocation. In a system such as an LTE system, downlink and uplink communications are performed by allocating one or more resource blocks (RBs) to a user equipment terminal (UE). The resource blocks are shared by plural user equipment terminals in the system. In the LTE system, the base station determines to which user equipment terminal among the plural user equipment terminals the resource block is allocated in each sub-frame of 1 ms. The sub-frame may be referred to as a transmission time interval (TTI).

The scheduling unit 13 selects a scheduling-target user based on the presence or absence of information to be communicated, the amount of available data (described below), or the like. For each scheduling-target user, a scheduling metric is calculated. The scheduling metric is calculated based on a CQI for downlink or quality (SIR: signal-to-interference ratio) of reference signals for uplink. For example, the scheduling metric may be calculated according to a known scheduling algorithm such as a proportional fairness algorithm or a MAX-CI algorithm, for example. In general, the larger the scheduling metric, the more likely a radio resource is allocated. Thus, when information to be communicated has a high priority level, a factor, a coefficient, or a multiplier is applied to the scheduling metric so that the high priority level affects the scheduling metric, and thus a larger scheduling metric is obtained. On the other hand, for information to be communicated having a low priority level, a factor which decreases the scheduling metric may be used. Radio resources are allocated to users in descending order of scheduling metrics by mutually comparing the scheduling metrics calculated in this manner.

The priority level is described below. The base station receives from the core network 12 a quality of service class indicator (QCI) for information to be communicated by a user. This QCI represents a priority level of information to be communicated by the user. The scheduling unit 13 multiplies the scheduling metric of the user with a factor based on the QCI so that the scheduling metric becomes a value according to the priority level such as the QCI. More specifically, a logical channel priority (LCP) is provided according to the QCI in downlink. For example, an LCP value for a QCI indicating voice data is set to one and an LCP value for a QCI indicating best-effort communication data such as web communication data is set to two. In this example, it is assumed that a lower value represents a higher priority level. In this example, voice data with LCP=1 has a higher priority level than communication data with LCP=2. In this manner, the scheduling metric is adjusted according to the LCP corresponding to the QCI in downlink. Similarly, a priority level can be applied to uplink. In uplink, a logical channel group (LCG) is defined rather than the LCP. Thus, the scheduling metric may be adjusted according to the LCG. Since the number of LCGs is smaller than the number of LCPs, more priority levels can be provided using the number of LCPs and the number of indexes by associating an index with the LCG.

For example, when the number of LCGs is equal to four and the number of indexes is equal to eight, thirty-two priority levels can be provided. Similarly, in downlink, an index may be associated with the LCP. For example, the number of LCPs is equal to sixteen and the number of indexes is equal to two, thirty-two priority levels can be provided.

The scheduling unit 13 determines a data modulation scheme and a channel coding rate to be used for communications, in addition to determining a radio resource to be allocated to a user. This is also referred to as a transport format and resource selection (TFR). The data modulation scheme and the channel coding rate are selected from predetermined sets.

The control signal generating unit 14 generates a control signal to be transmitted to a user equipment terminal (UE). In general, when scheduling is performed as described above, to which user equipment terminal a shared channel is allocated in each sub-frame has to be signaled (provided). The control signal used for this signaling is referred to as a physical downlink control channel (PDCCH). For example, the PDCCH includes downlink and uplink scheduling information and a transmission power control command bit. For example, the downlink scheduling information includes information about the downlink shared channel such as downlink resource block allocation information, a data size, a modulation scheme, and HARQ (hybrid automatic repeat request) information. For example, the uplink scheduling information includes information about the uplink shared channel such as uplink resource allocation information, a data size, a modulation scheme, and uplink transmission power information. An information bit sequence to be transmitted via the PDCCH is encoded using a convolutional code and then a CRC code for error detection is added. A final encoded bit sequence can be obtained by combining identification information (RNTI: radio network temporary identifier) of a user equipment terminal and the CRC bits using a logical OR operation so that each user can detect the user's own PDCCH.

The data signal generating unit 15 generates a data signal to be transmitted to a user equipment terminal (UE). This data signal corresponds to the physical downlink shared channel (PDSCH). The PDSCH is encoded and data-modulated using the channel coding rate and the data modulation scheme determined by the scheduling unit 13 and then mapped to the determined radio resource.

The downlink signal transmitting unit 16 generates downlink radio signals including the control signal and the data signal and transmits them to the user equipment terminal.

The data amount calculating unit 17 calculates the amount of available data $D_{available}$ for each user. The amount of available data $D_{available}$ a measure of how much data the user can communicate under the limitation of the maximum rate defined by AMBR. The amount of available data $D_{available}$ is updated in two scenarios. In a first scenario, the amount of available data $D_{available}$ is updated when a radio resource is allocated to a scheduling-target user (a user to be scheduled). In this scenario, the amount of data $D_{assign}$ to be communicated using the allocated radio resource is subtracted from the amount of available data $D_{available}$ for the user to which the radio resource is allocated.

$$D_{available}=D_{available}-D_{assign} \quad (1)$$

The amount of available data $D_{available}$ is updated only for users to which a radio resource is actually allocated. The amount of data $D_{assign}$ may be expressed as any appropriate amount. For example, the amount of data $D_{assign}$ may be expressed as a transport block size (TBS) to be communicated by a user. Alternatively, the amount of data $D_{assign}$ may be expressed as a MAC service data unit (MAC SDU). The transport block size (TBS) includes a MAC header, a MAC control element, and padding bits in addition to the MAC SDU. Among them, a specific content (data) to be communicated by a user is included in the MAC SDU. Thus, an approach that the amount of data $D_{assign}$ is expressed as the amount of data defined by a MAC SDU is preferable from the viewpoint of updating the amount of available data $D_{available}$ based on content data intended by a user. On the other hand, an approach that the amount of data $D_{assign}$ is expressed as the amount of data defined by a transport block size (TBS) is preferable from the viewpoint of limiting an actual rate in the physical layer.

In a second scenario, the amount of available data $D_{available}$ is updated when the control period including plural time intervals for allocating radio resources is elapsed. In the LTE system, a time interval for allocating radio resources is a sub-frame (TTI) of 1 ms. In this case, the control period $T_{AMBR}$ may be set to 100 ms or 1000 ms, for example. The control period $T_{AMBR}$ may be set in each base station or may be set to the same value in plural base stations. In addition, the control period $T_{AMBR}$ may be provided from the core network 12 or by an operator or the like. In either case, when the control period $T_{AMBR}$ is elapsed, the amount of available data $D_{available}$ for each user within a cell is updated to be the smaller of a reference data amount $D_{ref}$ or the amount of available data $D_{available}$ for each user plus the reference data amount $D_{ref}$.

$$D_{available}=\min((D_{available}+D_{ref}),D_{ref}) \quad (2)$$

The amount of available data $D_{available}$ is updated for all users regardless of whether a radio resource is allocated to a user. The reference data amount $D_{ref}$ is the amount of data which can be transmitted in the control period $T_{AMBR}$ under the limitation of the maximum rate AMBR. The reference data amount $D_{ref}$ is derived based on both the maximum rate AMBR provided from the core network 12 and the control period $T_{AMBR}$.

$$D_{ref}=T_{AMBR}*N_{max}$$

$N_{max}$ is a maximum number of bits which can be allocated in a time interval for allocating radio resources. For example, it is assumed that the maximum rate AMBR is equal to 5 Mbps, $T_{AMBR}$ is equal to 1000 ms, and the time interval for allocating radio resources is equal to 1 ms. Under this assumption, $D_{ref}$=5000000 bits and $N_{max}$=5000000 bps/1000 ms (1 ms for each time)=5000 bits.

The data amount calculating unit 17 calculates the amount of available data $D_{available}$ for each user according to the equations (1) and (2) and provides the calculation result to the scheduling unit 13. How to specifically use the amount of available data $D_{available}$ is described below with reference to the flowcharts.

Although the amount of available data $D_{available}$ is updated for all users regardless of whether a radio resource is allocated to a user in this embodiment, the amount of available data $D_{available}$ may be updated only for users having data to be transmitted at the timing of the update. In this case, when the control period $T_{AMBR}$ is elapsed, the data amount calculating unit 17 checks the presence or absence of data to be communicated by each user, selects users having data to be communicated, and updates the amount of available data $D_{available}$ for the selected users, for example. The amount of available data $D_{available}$ for the non-selected users is not updated and is maintained (remains unchanged). This allows a user to feel the limitation of a rate in a situation where the user desires to communicate, and thus the rate is effectively and appropriately limited, as described below.

<2. Operational Flow>

Figure 2:
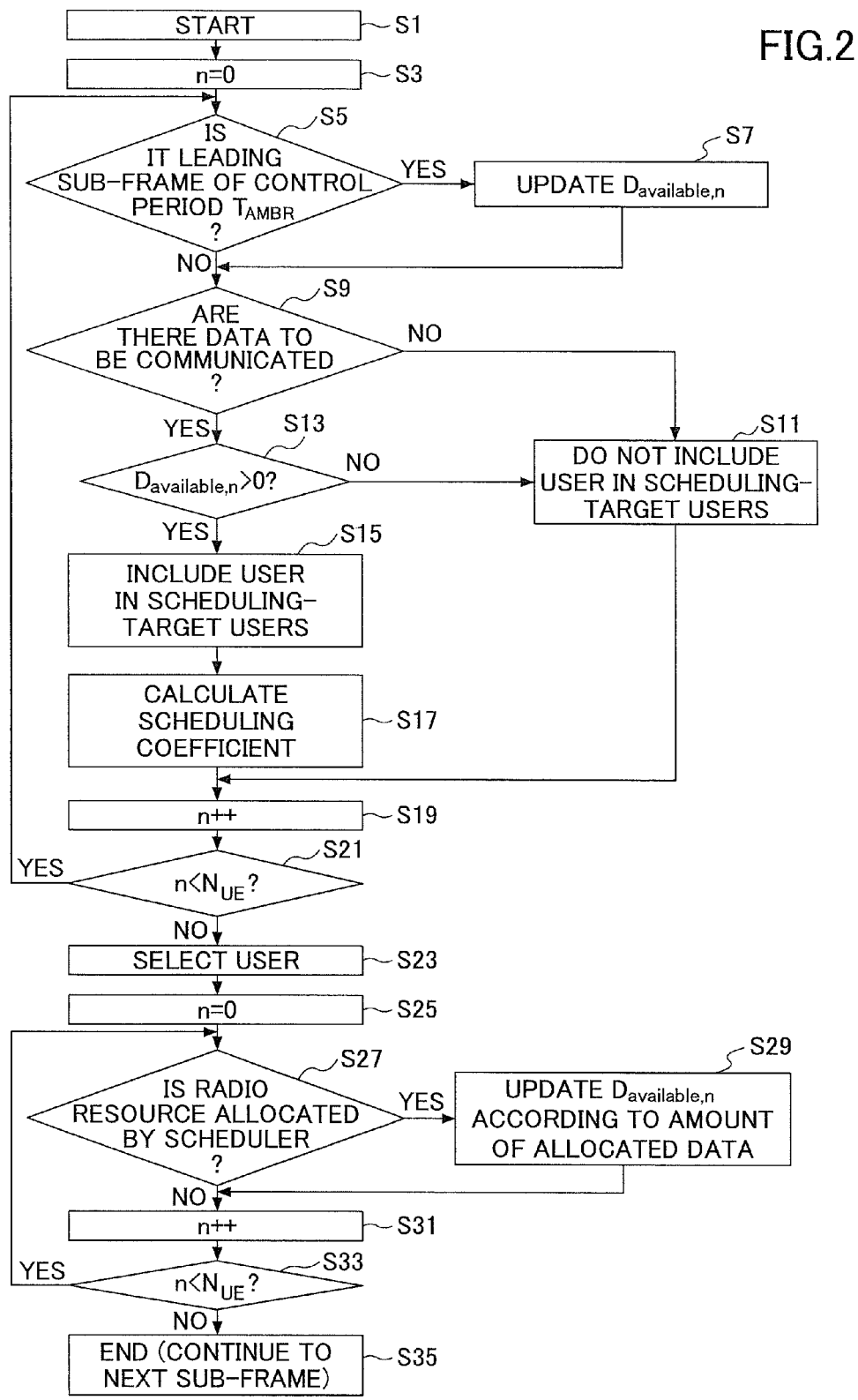
FIG. 2 shows an exemplary flowchart of operations performed by a base station.

FIG. 2 shows an exemplary flowchart of operations performed by the base station shown in FIG. 1. The operational flow begins at step S1 and proceeds to step S3. At step S3, a parameter n specifying a user is initialized. For convenience of explanation, it is assumed that $N_{UE}$ user equipment terminals in total are situated in a cell covered by the base station and each user equipment terminal is specified by n=0, . . . , $N_{UE}-1$.

At step S5, it is determined whether the present time (current sub-frame) corresponds to a leading sub-frame of a control period $T_{AMBR}$. For convenience of explanation, it is assumed that the control period $T_{AMBR}$ is equal to 1000 ms and scheduling (allocation of radio resources) is performed every 1 ms. Thus, the control period $T_{AMBR}$ includes 1000 sub-frames. When the present time corresponds to the leading sub-frame of the control period $T_{AMBR}$, the operational flow proceeds to step S7.

At step S7, the amount of available data $D_{available}$ for all users is updated according to the equation (2). Then, the operational flow proceeds to step S9. When the present time does not correspond to the leading sub-frame of the control period $T_{AMBR}$, the operational flow also proceeds to step S9.

At step S9, it is determined whether the user specified by the present parameter n has data to be communicated. When there are no data to be communicated, the operational flow proceeds to step S11, where it is determined that the user is not included in scheduling-target users. When there are data to be communicated, the operational flow proceeds to step S13.

At step S13, it is determined Whether the amount of available data $D_{available}$ for the user specified by the present parameter n is a positive value. When the amount of available data $D_{available}$ is a positive value, there remains a resource available for allocation (a resource waiting for allocation). When the amount of available data $D_{available}$ is less than or equal to zero, there remains no resource available for allocation in general. In an exceptional case, the user may communicate using a resource. This exceptional case is described below in a modified embodiment of the present invention. When the amount of available data $D_{available}$ is not a positive value, the operational flow proceeds to step S11, where it is determined that the user is not included in scheduling-target users. When the amount of available data $D_{available}$ is a positive value, the operational flow proceeds to step S15.

At step S15, it is determined that the user specified by the present parameter n is included in scheduling-target users.

At step S17, a scheduling metric is calculated for the scheduling-target user. The scheduling metric is calculated based on a CQI for downlink or quality (SIR) of reference signals for uplink. For example, the scheduling metric may be calculated according to a known scheduling algorithm such as a proportional fairness algorithm or a MAX-CI algorithm, for example. In addition, a factor, a coefficient, or a multiplier may be applied to the scheduling metric so that the scheduling metric increases according to a priority level of information to be communicated.

At step S19, the parameter n specifying a user is updated (incremented) to a next value.

At step S21, it is determined whether all users in the cell have had the determination of whether they are included in the scheduling-target users. When the determination is not made for all users, the operational flow returns to step S5 and the operations as described above are performed. When the determination is made for all users, the operational flow proceeds to step S23.

At step S23, radio resources are allocated to users in descending order of scheduling metrics by mutually comparing the scheduling metrics of the scheduling-target users. Thus, even though a user is a scheduling-target user, a radio resource may not be actually allocated to the user.

During steps S25-S33, for users to which a radio resource is actually allocated, the amount of available data $D_{available}$ is updated according to the equation (1). At step S25, the parameter n specifying a user is initialized again.

At step S27, it is determined whether a radio resource is allocated to the user specified by the present parameter n at step S23. When a radio resource is allocated to the user, the operational flow proceeds to step S29.

At step S29, the amount of available data $D_{available}$ for the user is updated according to the equation (1). Then, the operational flow proceeds to step S31. When a radio resource is not allocated to the user specified by the present parameter n, the operational flow also proceeds to step S31.

At step S31, the parameter n specifying a user is updated (incremented) to a next value.

At step S33, it is determined whether the amount of available data $D_{available}$ is updated for all users to which a radio resource is allocated. When the amount of available data $D_{available}$ is not updated for all users, the operational flow returns to step S27 and the operations as described above are performed. When the amount of available data $D_{available}$ is updated or maintained for all users, the operational flow in the current sub-frame is completed and similar operations are performed in a next sub-frame (step S35).

It should be noted that the parameter n changes from 0 to $N_{UE}$ one by one during steps S25-S33. However, the amount of available data $D_{available}$ for a user to which a radio resource is not allocated remains unchanged. Thus, steps S25-S33 may be performed only for the parameter n specifying users to which a radio resource is actually allocated.

<3. Modified Embodiment>

In FIG. 2, when the amount of available data $D_{available}$ for a user is not a positive value, the user is not included in scheduling-target users. This is preferable from the viewpoint of simply complying with the maximum rate provided from the core network. However, it is preferable in certain circumstances that some types of information such as voice data, real-time data, or control information for handover not be prohibited from communications. A modified embodiment addresses these circumstances.

Figure 3:
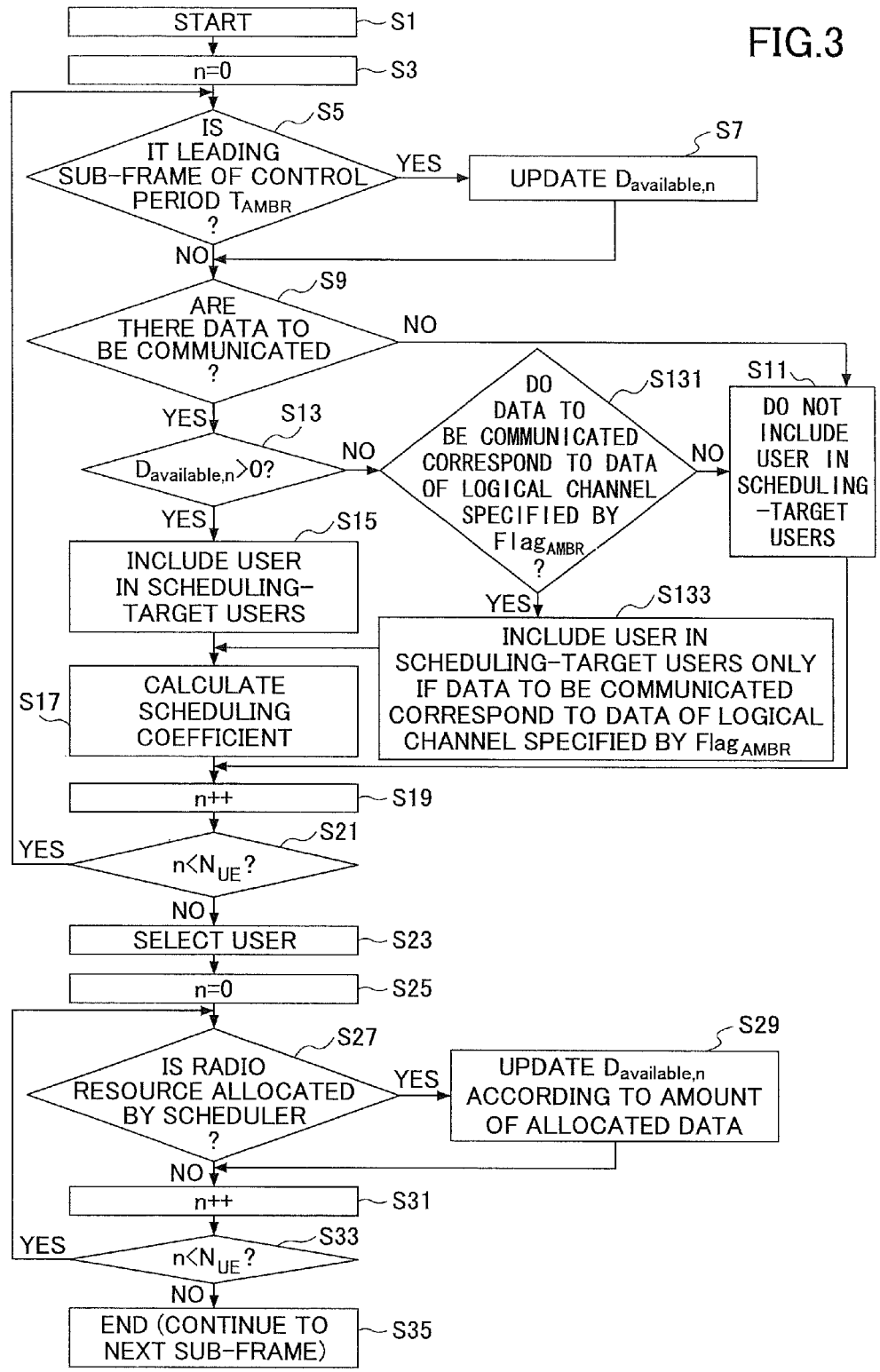
FIG. 3 shows an exemplary flowchart of operations performed by a base station according to a modified embodiment of the present invention.

FIG. 3 shows an exemplary flowchart of operations according to the modified embodiment. Although the flowchart shown in FIG. 3 is generally the same as the flowchart shown in FIG. 2, the flowchart shown in FIG. 3 further includes steps S131 and S133.

When the amount of available data $D_{available}$ for the user specified by the present parameter n is not a positive value at step S13, the operational flow proceeds to step S131.

At step S131, it is determined whether data to be communicated correspond to information with a high priority level. In the modified embodiment, whether data correspond to information with a high priority level is determined based on whether a flag $Flag_{AMBR}$ associated with the information is set to a predetermined value. For example, the predetermined value is equal to one ($Flag_{AMBR}=1$). When data to be communicated does not correspond to information with a high priority level, the operational flow proceeds to step S11, where it is determined that the user is not included in scheduling-target users. When data to be communicated correspond to information with a high priority level, the operational flow proceeds to step S133.

At step S133, it is determined that the user specified by the present parameter n is included in scheduling-target users. This operation is significantly different from that of FIG. 2, since in FIG. 2, this user is not included in scheduling-target users. Then, the operational flow proceeds to step S17 and the operations as described above are performed.

According to the modified embodiment, when data to be communicated correspond to information with a high priority level, a user is included in scheduling-target users even though the amount of available data $D_{available}$ for the user is empty (not a positive value). Thus, signals such as voice data and real-time data which should not be interrupted can be continuously communicated. Alternatively, control information which should not be delayed can be promptly communicated.

It should be noted that when a radio resource is allocated to a user regardless of the absence of the amount of available data $D_{available}$ for the user and the update is performed at step S29, the amount of available data $D_{available}$ results in a negative value. This is because the amount of data $D_{assign}$ used for communications is subtracted according to the equation (1). In this case, the amount of available data plus the reference data amount ($D_{available}+D_{ref}$) is smaller than the reference data amount $D_{ref}$. Thus, the amount of available data $D_{available}$ in a next control period $T_{AMBR}$ is set to a smaller value than the reference data amount $D_{ref}$ at step S7. As a result, considering both the current control period $T_{AMBR}$ during which a radio resource is allocated even though the amount of available data is a negative value and the next control period $T_{AMBR}$, the limitation of the maximum rate is not exceeded as a whole, as described below with reference to FIG. 4.

<4. Description of Operations>

Figure 4:
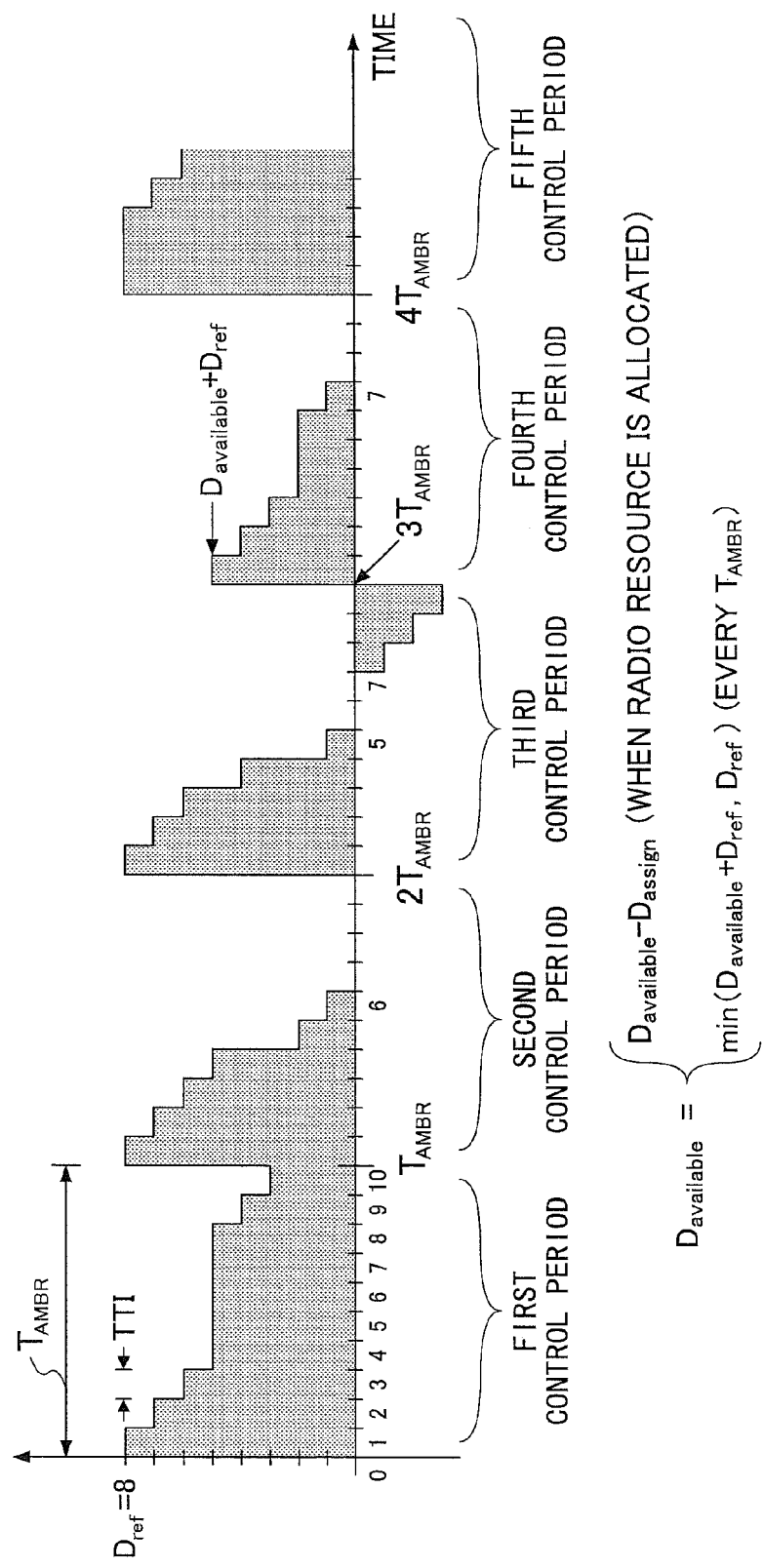
FIG. 4 shows a diagram for illustrating operations according to the embodiment and the modified embodiment of the present invention.

FIG. 4 conceptually shows how the amount of available data $D_{available}$ for a user is updated according to the embodiment and the modified embodiment of the present invention. For convenience of explanation, it is assumed that scheduling of radio resource allocation is performed in each sub-frame (1 TTI) and the control period $T_{AMBR}$ is equal to ten sub-frames (10 TTIs). In addition, it is assumed that the reference data amount $D_{ref}$ is equal to eight and the amount of data $D_{assign}$ assigned in each sub-frame is equal to one ($D_{assign}=1$). The operations during first and second control periods correspond to the operations in FIG. 2 and the operations during third and fourth control periods correspond to the operations in FIG. 3.

In the first sub-frame in the first control period, the amount of available data $D_{available}$ is set to the reference data amount $D_{ref}=8$. In the first to third sub-frames, radio resources are allocated to the user, and thus the amount of available data $D_{available}$ decreases in each sub-frame. This is caused by the update according to the equation (1). In the fourth to eighth sub-frames, the amount of available data $D_{available}$ remains unchanged and is equal to five. These situations correspond to the case where there are no data to be communicated or the case where a radio resource is not allocated. When the tenth sub-frame in the first control period ends, the amount of available data $D_{available}$ is not empty (+3). Thus, the amount of available data $D_{available}$ plus the reference data value ($D_{available} D_{ref}$)=3+8=11 is larger than the reference data amount $D_{ref}=8$. As a result, in the first sub-frame in the second control period, the amount of available data $D_{available}$ is updated to the the update according to the equation (2) at step S7.

In the first to sixth sub-frames in the second control period, radio resources are allocated to the user, and thus the amount of available data $D_{available}$ decreases in each sub-frame. In the sixth sub-frame, the amount of available data $D_{available}$ is equal to zero. This is caused by the update according to the equation (1). In the seventh to tenth sub-frames in the second control period, the amount of available data $D_{available}$ remains unchanged and is equal to zero. These situations correspond to the case where the user is not included in scheduling-target users. In these sub-frames, the operational flow proceeds from step S13 to step S11. When the tenth sub-frame in the second control period ends, the amount of available data $D_{available}$ is equal to zero. Thus, the amount of available data $D_{available}$ plus the reference data value ($D_{available}+D_{ref}$) is the same as the reference data amount $D_{ref}$. As a result, in the first sub-frame in the third control period, the amount of available data $D_{available}$ is updated to the reference data amount $D_{ref}=8$. This is caused by the update according to the equation (2) at step S7.

In the first to fifth sub-frames in the third control period, radio resources are allocated to the user, and thus the amount of available data $D_{available}$ decreases in each sub-frame. In the fifth sub-frame, the amount of available data $D_{available}$ is equal to zero. This is caused by the update according to the equation (1). In the sixth and seventh sub-frames in the third control period, the amount of available data $D_{available}$ remains unchanged and is equal to zero. These situations correspond to the case where the user is not included in scheduling-target users. In these sub-frames, the operational flow proceeds from step S13 to step S11. In the eighth to tenth sub-frames in the third control period, radio resources are allocated to the user even though the amount of available data $D_{available}$ is not a positive value. As a result, the amount of available data $D_{available}$ decreases in each sub-frame. In the tenth sub-frame, the amount of available data $D_{available}$ is equal to −3. This is caused by steps S131 and S133 in FIG. 3 and by the update according to the equation (1). Thus, the amount of available data $D_{available}$ plus the reference data value ($D_{available} D_{ref}$)=−3+8=5 is smaller than the reference data amount $D_{ref}=8$. As a result, in the first sub-frame in the fourth control period, the amount of available data $D_{available}$ is updated to a smaller value ($D_{available} D_{ref}$)=5. This is caused by the update according to the equation (2) at step S7.

In the first to seventh sub-frames in the fourth control period, radio resources are allocated to the user, and thus the amount of available data $D_{available}$ decreases in each sub-frame. In the seventh sub-frame, the amount of available data $D_{available}$ is equal to zero. This is caused by the update according to the equation (1). In the eighth to tenth sub-frames in the fourth control period, the amount of available data $D_{available}$ remains unchanged and is equal to zero. These situations correspond to the case where the user is not included in scheduling-target users. In these sub-frames, the operational flow proceeds from step S13 to step S11. When the tenth sub-frame in the fourth control period ends, the amount of available data $D_{available}$ is equal to zero. Thus, the amount of available data $D_{available}$ plus the reference data value ($D_{available} D_{ref}$) is the same as the reference data amount $D_{ref}$. As a result, in the first sub-frame in the fifth control period, the amount of available data $D_{available}$ is updated to the reference data amount $D_{ref}=8$. This is caused by the update according to the equation (2) at step S7.

When the reference data amount $D_{ref}$ at most is communicated in a single control period as in the first or second control period, a communication rate in the control period does not exceed the maximum rate. When the amount of data which exceeds the reference data amount $D_{ref}$ is communicated in a single control period as in the third control period, the amount of data is balanced in the fourth control period. This can be achieved by subtracting the amount of data excessively used in the third control period from the amount of available data in the fourth control period. Although, in the shown example, the amount of data excessively used in the third control period is balanced in (removed from) the fourth control period, the amount of data excessively used for communications may be balanced in two or more control periods.

In the embodiments as described above, the base station performs scheduling for a user in such a manner that the amount of data to be communicated by the user is limited to a constant value $D_{ref}$ or less within the whole of one or more control periods $T_{AMBR}$, as a general rule. In addition, the amount of available data $D_{available}$ which is a measure of the number of resources which can be allocated to the user is updated in each control period $T_{AMBR}$ equally (evenly) for all users. However, updating the amount of available data $D_{available}$ in each control period $T_{AMBR}$ equally for all users may not be preferable from the viewpoint of limiting the amount of data to be communicated by the user.

For example, it is assumed that user's data are generated in the level of 15 Mbps every three second, when the control period $T_{AMBR}$ is equal to one second (1000 ms), the maximum rate AMBR is equal to 5 Mbps, and the reference data amount $D_{ref}$ is equal to 5000000 bits. It is also assumed that a transport block size (TBS) of 15000000 bits is allocated to the user in a first control period. In this case, the amount of available data $D_{available}$ is equal to 5000000-15000000=-10000000 bits. After one second, at the beginning of a second control period, the amount of available data $D_{available}$ is updated to -10000000+5000000=-5000000 bits. At the beginning of a next third control period, the amount of available data $D_{available}$ is equal to -5000000+5000000=0. At the beginning of a fourth control period which is after three seconds from the first communication of 15 Mbps, the amount of available data $D_{available}$ is equal to 0+5000000=5000000 bits. For this user, since data in the level of 15 Mbps are generated every three seconds, the amount of available data $D_{available}$ is equal to 5000000 bits both in the first communication and after the three seconds. This means that the rate is not limited for this user. In other words, this approach does not allow the user to feel the limitation of the rate.

In order to address this situation, the amount of available data $D_{available}$ is updated only if there are data to be transmitted. In this example, when a transport block size (TBS) of 15000000 bits is allocated to the user in the first control period, the amount of available data $D_{available}$ is equal to 5000000-15000000=-10000000 bits. After one second, in the second control period, the amount of available data $D_{available}$ is not updated and remains unchanged, since there are no data to be transmitted in the second control period. The amount of available data $D_{available}$ is equal to -10000000 bits. After two seconds, in the third control period, the amount of available data $D_{available}$ is not updated and remains unchanged, since there are no data to be transmitted in the third control period. The amount of available data $D_{available}$ is equal to -10000000 bits. After three seconds, in the fourth control period, the amount of available data $D_{available}$ is updated, since data in the level of 15 Mbps are generated. The amount of available data $D_{available}$ is updated to -10000000+5000000=-5000000 bits. However, radio resources are not allocated, since the amount of available data $D_{available}$ is not a positive value. After four seconds, in a fifth control period, the amount of available data $D_{available}$ is updated, since there are (remains) data to be transmitted in the fifth control period. The amount of available data $D_{available}$ is updated to -5000000+5000000=0. Since the amount of available data $D_{available}$ is not still a positive value, radio resources are not allocated. After five seconds, in a sixth control period, the amount of available data $D_{available}$ is updated, since there are (remains) data to be transmitted in the sixth control period. The amount of available data $D_{available}$ is updated to 0+5000000=5000000 bits. Since the amount of available data $D_{available}$ becomes a positive value, radio resources can be allocated. In this manner, updating the amount of available data $D_{available}$ only if there are data to be transmitted allows the user to feel the limitation of the rate.

While the present invention has been described with reference to the specific embodiments, the embodiments are merely illustrative, and variations, modifications, alterations, and substitutions may be conceived by those skilled in the art. For example, the present invention may be applied to any appropriate mobile communication system where scheduling of radio resources is performed under the limitation of a maximum rate. For example, the present invention may be applied to a W-CDMA system, an HSDPA/HSUPA based W-CDMA system, an LTE system, an LTE-Advanced system, an IMT-Advanced system, a WiMAX system, a Wi-Fi system, and so on. Specific examples of numerical values have been used in order to facilitate understanding of the invention. However, these numerical values are merely illustrative, and any other appropriate values may be used, except as indicated otherwise. The separations of the embodiments or the sections are not essential to the present invention, and subject matters described in two or more sections may be combined and used (provided that they do not contradict) when needed. For convenience of explanation, the apparatuses according to the embodiments of the present invention have been explained by using functional block diagrams. However, these apparatuses may be implemented in hardware, software, or combinations thereof. The software may be provided in a random access memory (RAM), a flash memory, a read-only memory (ROM), an EPROM, an EEPROM, a resister, a hard disk (HDD), a removable disk, a CD-ROM, a database, a server, and any other suitable recording medium; The present invention is not limited to the embodiments as described above, and various variations, modifications, alterations, substitutions, and so on are included, without departing from the spirit of the present invention.

This international patent application is based on Japanese Priority Application No. 2010-094306 filed on Apr. 15, 2010, the entire contents of which are incorporated herein by reference.

DESCRIPTION OF NOTATIONS 11 uplink signal receiving unit
12 core network
13 scheduling unit
14 control signal generating unit
15 data signal generating unit
16 downlink signal transmitting unit
17 data amount calculating unit

The invention claimed is:
1. A base station in a mobile communication system, comprising:
a scheduling unit configured to allocate a radio resource to a scheduling-target user based on a scheduling metric which is calculated for each of scheduling-target users; and
a data amount calculating unit configured to calculate the amount of available data for each user; wherein
when the radio resource is allocated to the scheduling-target user, the data amount calculating unit subtracts the amount of data to be communicated using the allocated radio resource from the amount of available data for the scheduling-target user, the data amount calculating unit updates the amount of available data for each user within a cell to be less than or equal to a reference data amount in each control period including plural time intervals for allocating radio resources, the scheduling unit selects the scheduling-target user based on the amount of available data for each user, the scheduling-target users include a user having a remaining amount of available data and a user who does not have a remaining amount of available data, but plans to communicate information with a high priority level, and the amount of data which is less than or equal to the reference data amount is the smaller of the reference data amount and the amount of available data for each user plus the reference data amount.

2. The base station as claimed in claim 1, wherein a flag associated with the information with the high priority level is set to a predetermined value.

3. The base station as claimed in claim 2, wherein the information with the high priority level is transmitted via a voice signal, a real-time data signal, or a control signal.

4. The base station as claimed in claim 1, wherein the reference data amount is derived from both a maximum rate for each user provided from a core network and the control period.

5. The base station as claimed in claim 1, wherein when the radio resource is allocated to the scheduling-target user, the amount of data which is subtracted from the amount of available data by the data amount calculating unit is the amount of data defined by a transport block size.

6. The base station as claimed in claim 1, wherein when the radio resource is allocated to the scheduling-target user, the amount of data which is subtracted from the amount of available data by the data amount calculating unit is the amount of data defined by a MAC SDU.

7. The base station as claimed in Claim 1, wherein the data amount calculating unit checks a presence or absence of data to be communicated by a user in each control period and updates the amount of available data for a user having data to be communicated to be less than or equal to the reference data amount.

8. A method in a base station in a mobile communication system, comprising the steps of:

allocating a radio resource to a scheduling-target user based on a scheduling metric which is calculated for each of scheduling-target users; and calculating the amount of available data for each user; wherein when the radio resource is allocated to the scheduling-target user, the calculating step comprises subtracting the amount of data to be communicated using the allocated radio resource from the amount of available data for the scheduling-target user, the calculating step comprises updating the amount of available data for each user within a cell to be less than or equal to a reference data amount in each control period including plural time intervals for allocating radio resources, the allocating step comprises selecting the scheduling-target user based on the amount of available data for each user, the scheduling-target users include a user having a remaining amount of available data and a user who does not have a remaining amount of available data, but plans to communicate information with a high priority level, and the amount of data which is less than or equal to the reference data amount is the smaller of the reference data amount and the amount of available data for each user plus the reference data amount.

* * * * *